United States Patent [19]

Singh et al.

[11] 4,184,993

[45] Jan. 22, 1980

[54] PLASTICIZER, PLASTICIZED RESIN COMPOSITION AND PROCESS FOR PREPARATION THEREOF

[75] Inventors: Udai P. Singh, Rochester, N.Y.; John T. Lutz, Jr., Cornwells Heights, Pa.

[73] Assignee: Rohm and Haas Company, Philadelphia, Pa.

[21] Appl. No.: 793,655

[22] Filed: May 4, 1977

Related U.S. Application Data

[63] Continuation-in-part of Ser. No. 680,544, Apr. 27, 1976, abandoned, which is a continuation-in-part of Ser. No. 614,462, Sep. 18, 1975, abandoned.

[51] Int. Cl.$^2$ ............................ C08K 5/10; C08K 5/11
[52] U.S. Cl. ............................ 260/31.2 R; 260/31.6; 428/500; 526/324; 526/329; 560/190; 560/205
[58] Field of Search ......... 260/486 R, 31.2 R, 31.6 R, 260/897 B; 526/329, 348.2, 348.3, 348.4, 324, 190, 205

[56] References Cited

U.S. PATENT DOCUMENTS

| | | | |
|---|---|---|---|
| 2,055,456 | 9/1936 | Eichwald | 526/329 |
| 2,384,569 | 9/1945 | Semon | 526/324 |
| 2,756,219 | 7/1956 | van der Plas et al. | 526/324 |
| 3,183,217 | 5/1965 | Serniuk et al. | 526/329 |
| 3,251,797 | 5/1966 | De Pugh et al. | 260/30.8 R |
| 3,488,311 | 1/1970 | Burdick et al. | 260/31.2 R |

OTHER PUBLICATIONS

Doak, J. Am. Chem. Soc. (72) (1950), pp. 4681–4686.

*Primary Examiner*—Harry Wong, Jr.
*Attorney, Agent, or Firm*—Michael B. Fein

[57] ABSTRACT

Plasticizers are prepared from a monomer mixture consisting essentially of (A) one or more olefins having 6 to 18 carbon atoms and (B) one or more $C_1$ to $C_6$ esters or diesters of monoethylenically unsaturated mono- or di-carboxylic acids. Blends of the plasticizers with different polymers, for example polyvinyl chloride, are also prepared.

15 Claims, No Drawings

PLASTICIZER, PLASTICIZED RESIN COMPOSITION AND PROCESS FOR PREPARATION THEREOF

This is a continuation-in-part of Ser. No. 680,544 of Apr. 27, 1976, which is in turn a continuation-in-part of Ser. No. 614,462 of Sept. 18, 1975, both of which are now abandoned.

This invention relates to improved plasticizers, blends of plasticizers with different polymers, and process for preparing the plasticizers and the blends.

Balmer et al, U.S. Pat. No. 3,224,996, disclose copolymers of an acrylate with either propylene or ethylene as plasticizers for vinyl polymers; these plasticizers have good performance properties, but tend to be inefficient in plasticizing and softening, and the resins plasticized with these plasticizers flux too slowly during processing. Furthermore, the plasticizer/resin blends generally are not sufficiently clear and do not possess sufficient tear strength for many applications. Another disadvantage of the Balmer et al. plasticizers is the high pressure, usually about 1000 to 10,00 psig., required for their preparation.

Coaker et al, U.S. Pat. Nos. 3,809,667 and 3,923,720 disclose liquid copolymers of two different alkyl acrylate monomers useful as flow improvers for a variety of polymeric substrates. They do not disclose or suggest the utility of substantially less costly polymers containing significant amount of copolymerized olefin for the purposes of such flow reduction, nor are their polymers suitable for the plasticization of poly(vinyl chloride).

Leister et al., U.S. Pat. No. 3,968,148, disclose oligomeric terpolymers of 1-alkenes and certain esters of unsaturated acids in a number-average molecular weight range similar to applicants'. It will be perceived by examination of their patent that their work was solely directed to oil additive applications, and that no suggestion was made that these polymers would be useful for the uses herein disclosed.

It is an object of the present invention to produce plasticizer polymers having high efficiency in plasticization and softening, and shorter flux times.

A further object is to prepare plasticizers at low pressures.

A still further object of the invention is to prepare plasticized compositions having improved electrical insulating properties which are retained after exposure to water.

Another object is to produce plasticized vinyl chloride compositions having good fogging resistance and hydrocarbon resistance.

Another object is to provide modified polypropylene compositions having improved flow without significant loss in other physical properties.

These objects, and others which will become apparent from the following disclosure, are achieved by the present invention which comprises a blend of about 1 to 600 parts by weight of a plasticizer which is the free radical polymerization product of (A) one or more olefins having 6 to 18 carbon atoms, and (B) one or more $C_1$ to $C_6$ esters or diesters of monoethylenically unsaturated mono- or di-carboxylic acids, the molar ratio of (A) to (B) being about 0.1/1 to 1.5/1, with about 100 parts of a different polymer.

The olefins having 6 to 18 carbon atoms are monoethylenically unsaturated hydrocarbons and can be linear, branched or cyclic. Oligomers of ethylene, propylene, butylene, isobutylene, pentene, hexene, and the like, having the specified carbon atoms, or linear alpha-olefins, such as octene-1, decene-1 and the like, are the preferred olefin sources. The suitable olefins are preferably liquids at room temperatures. Mixtures of olefins are suitable.

The $C_1$ to $C_6$ esters or diester of monoethylenically unsaturated mono- and di-carboxylic acids are vinyl esters such as alkyl acrylates, monounsaturated diesters such as dialkyl maleate or fumarate and the like. "$C_1$ to $C_6$ esters or diesters" is meant to include esters derived from alcohols having one to six carbon atoms, i.e., the $C_1$ to $C_6$ refers to the alcohol-derived moiety. For example, methyl acrylate, ethyl acrylate, methyl thioacrylate, ethyl thioacrylate, methyl thioacrylate, methyl di-thio-acrylate, diethyl methyl maleate, diethyl maleate, dimethyl fumarate, diethyl fumarate, 2-chloro-ethyl acrylate, 2-methoxyethyl acrylate, 2-ethoxy ethyl acrylate, vinyl acrylate, allyl acrylate, propyl acrylate, isopropyl acrylate, n-butyl acrylate, t-butyl acrylate, isobutyl acrylate, sec-butyl acrylate, n-amyl acrylate, isopropyl thio acrylate, phenyl acrylate, cyclohexyl acrylate, cyclopentyl acrylate and phenyl thio acrylate etc. Methacrylates such as methyl methacrylate and 2-ethyl hexyl methacrylate are also suitable. Mixtures of one or more of these esters and diesters are suitable.

The preferred esters are $C_1$ to $C_6$ alkyl acrylates and mixtures thereof. One particularly preferred mixture is of ethyl acrylate with butyl acrylate.

The polymerization product of (A) and (B) further includes polymerized units of (C) monovinylidene monomers which are chosen from the group which are polymerized or copolymerized by free radical initiation and can include acrylonitrile, methacrylonitrile, fumaronitrile, acrylic acid, methacrylic acid, maleic anhydride, itaconic acid, acrylamide, methacrylamide, N-alkylacrylamide, N,N-dialkyl acrylamide, 2-hydroxyethyl acrylate, 2-hydroxypropyl acrylate, vinyl acetate, vinyl 2-ethylhexoate, styrene, vinyl toluene, chlorostyrene, vinyl chloride, and vinylidene chloride.

The ratio of the olefin (A) to the ester of diester (B) in the monomer mixture can be widely varied. Usually a molar excess of olefin is used, generally in a molar ratio of about 0.5/1 to about 10/1, preferably about 0.5/1 to 4.5/1 and most preferably about 1/1 to 2.5/1. In the plasticizer polymer, the molar ratio of olefin to ester or diester is generally about 0.1/1 to 1.5/1 and preferably at least about 0.2/1. For plasticization or flow improvement of olefin-based polymers such as modified polypropylene, it is preferred that the molar ratio be about 0.4/1 to about 0.85/1.

The ratio of monomer (C) to the olefin (A) and ester or diester (B) can also be widely varied. In some cases, no monomer (C) is required to achieve the desired properties, in others, up to 0.25/1 (expressed as (C)/[(A)+(B)] may be required.

The plasticizers are prepared by polymerizing the monomer mixture at a temperature of about 120° to 250° C., preferably about 180° to 235° C., at low pressures (one of the advantages to the process aspect of the invention) on the order of about 2 to 15 atmospheres, preferably about 3 to 10 atmosphere, in the presence of free radical polymerization catalyst at a preferred concentration of about 0.1 to 10%, more preferably 0.5 to 2.5%, by weight based on acrylate. When the more reactive alpha-olefins are employed less vigorous reaction conditions may be utilized, including atmospheric pressure conditions.

Suitable catalysts as initiators include organic compounds having peroxide bonds in general, for example, diallyl peroxide, ketone peroxide, aldehyde peroxide, ether peroxide, hydroperoxide, dihydrocarbyl peroxide, peracid ester, percarbonate and percarbamate. Representative examples of the organic peroxide include benzoyl peroxide, lauroyl peroxide, caprylyl peroxide, 2,4-dichlorobenzoyl peroxide, 4-nitrobenzoyl peroxide, 4-methoxy benzoyl peroxide, 4-chloro benzoyl peroxide, acetyl peroxide, stearolyl peroxide, phthaloyl peroxide, methyl ethyl ketone peroxide, cyclohexanone peroxide, t-butyl hydroperoxide, p-methane hydroperoxide, diisopropyl benzene hydroperoxide, cumene hydroperoxide, di-t-butyl peroxide, dicumyl peroxide, t-butyl cumyl peroxide, t-butyl perbenzoate, t-butyl perisobutyrate, t-butyl peracetate, t-butyl peroxypivalate, phenyl percarbamate, diisopropyl percarbonate and t-butyl perisopropylcarbonate. Preferred are cumen hydroperoxide, di-t-butyl peroxide, t-butyl peracetate, and t-butyl hydroperoxide.

The plasticizer can be prepared by either a batch, semi-continuous, or continuous process at high yields, and with resulting molecular weight of about 500 to 6000 (number average); for plasticization of poly(vinyl chloride), a range of 700 to 1300 is preferred, whereas for flow improvement of polypropylene a range of 2500 to 4500 is preferred.

The plasticizer polymer is blended with a different polymer to provide flexible and semi-flexible articles. The blending is easily accomplished due to the easily handleable viscosity of the plasticizers usually in the range of about 10 to 60 poises. Suitable blending techniques include for example, dry blending or dispersion mixing, compounding on a heated two-roll mill, extrusion, calendering, casting, injection molding, and coating of a substrate.

The plasticizer polymer can be used as the sole plasticizer or can be used in combination with other plasticizers. The concentration of plasticizer in the blends is typically 1 to 90% by weight, more preferably about 5 to 50% by weight.

The different polymer is preferably a polymer or copolymer of vinyl chloride, usually PVC itself, but can also be polypropylene, polyethylene, polyvinylacetate, acrylic polymers, cellulosics, polyamides, polysulfides, polyurethanes, urethanes, polyvinylbutyral, polyvinylbutyral, polyvinylbutyralpolyvinylalcohol copolymers, synthetic rubbers, such as butadiene-acrylonitrile, butadiene-styrene, or chloroprene polymers, and various rigid thermosets, i.e., polyester resins, phenolic resins, urea formaldehyde resins, or melamine resins. The different polymer may be a blend of several polymers, such as polypropylene blended with and/or grafted to an ethylene/propylene rubbery substrate.

The blends can, and typically do, contain other additives such as stabilizers, fillers, pigments, foaming agents, or other conventional additives.

The blends of the invention have a very wide range of utilities. One very suitable use for the blends is for electrical insulating materials due to the superior electrical insulative properties which are retained even after exposure to water. The property of fogging resistance makes the blends very suitable for automotive interior applications. "Fogging" is the collection of condensed plasticizer vapors on interior glass surfaces of automobiles.

Another advantageous property deriving from the use of the plasticizers of the invention is higher clarity and tear strength versus the closest previous plasticizer; also "plasticizing efficiency", i.e., rate of fluxing, etc., is improved.

Another advantageous property deriving from the use of the polymers of this invention is the improved flow of modified polypropylene without sacrifice in other physical properties. It is known that certain impact-modified polypropylenes and also certain thermoplastic elastomers based on blends or grafts of polypropylene with ethylene/propylene elastomeric substrates exhibit undesirably poor flow in extruded and especially injection molding operations, which cannot be readily corrected by increase in processing temperature. The problem is most acute in regions of low shear, such as in the total filling of mold cavities. Polymers of the present invention at relatively low use levels allow improved flow without a sacrifice in the needed use properties of stiffness, elongation set, etc.

The following examples are presented to illustrate a few embodiments of the invention, but we do not intend the invention to be limited to the illustrated embodiments. All parts and percentages are by weight unless otherwise indicated.

| | |
|---|---|
| $\overline{M}_n$ | = Number Average Molecular Weight |
| $P_3$ | = Propylene trimer |
| EA | = Ethyl acrylate |
| BA | = Butyl acrylate |
| VSC | = Varnish Scale Color Test which is a standardized test |
| T135,000, °C. | = Temperature at which a modulus of 135,000 psi is achieved |
| ATREOL No. 9 | = A type of mineral oil |
| EHA | = Ethyl hexyl acrylate |
| AN | = Acrylonitrile |
| PPA | = Polypropylene adipate |
| DOP | = Dioctyl phthalate |
| 2-HEA | = Hydroxyethyl acrylate |
| DIB | = Diisobutylene |
| ULT | = Ultimate elongation |

EXAMPLE 1

To a 2-1, stirred Parr autoclave was added 126 parts propylene trimer (1.0 mole); the reactor was sealed and sparged with nitrogen and heated to 190° C. where the pressure was 40 psig. The gradual addition of 100 parts (1.0 mole) of ethyl acrylate, containing 1.2 parts (1% on wt. of acrylate) or cumene hydroperoxide (CHP) was begun at constant rate. The acrylate/CHP addition was completed over a period of 4 hours, at the end of which time the temperature was 200° C. and pressure 75 psig. The reactor was heated an additional 1.0 hr., at 190±5° C. and then cooled. The product was stripped of unreacted monomers (propylene trimer and ethyl acrylate) at a pot temperature of 50°–100° C./10-5 mm Hg and from lower mol. wt. volatiles at a pot temperature of 210° C. at 0.1 to 5 mm Hg. The product is undistilled bottoms materials, which needs no further purification. Yield 105 parts.

EXAMPLE 2

| Charge: | Parts: |
|---|---|
| Propylene trimer | 280 |
| Ethyl acrylate | 120 |
| Cumene hydroperoxide | 2.8 |

Process: That of Example 1. Product yield 120 parts.

EXAMPLE 3

| Charge: | Parts: |
|---|---|
| Propylene trimer | 315 |
| Ethyl acrylate | 100 |
| Cumene hydroperoxide | 3.15 |

Process: That of Example 1, except at a reactor temperature of 250° C. and 175 psig pressure. Product yield 118 parts.

EXAMPLE 4

| Charge: | Parts: |
|---|---|
| Propylene trimer | 560 |
| Ethyl acrylate | 120 |
| n-butyl acrylate | 120 |
| Cumene hydroperoxide | 1.2 |

Process: That of Example 1, except at a reactor temperature of 220° C. and 115 psig pressure. Product yield 260 parts.

EXAMPLE 5

| Charge: | Parts: |
|---|---|
| Propylene trimer | 560 |
| Ethyl acrylate | 160 |
| 2-ethylhexyl acrylate | 80 |
| Cumene hydroperoxide | 5.6 |

Process: That of Example 1. Product yield 265 parts.

EXAMPLE 6

| Charge: | Parts: |
|---|---|
| Propylene trimer | 280 |
| Ethyl acrylate | 140 |
| n-Butyl acrylate | 140 |
| Cumene hydroperoxide | 2.8 |

Process: That of Example 1, except polymerization temperature of 220° C. at 115 psig pressure. Product yield 220 parts.

EXAMPLE 7

| Charge: | Parts: |
|---|---|
| Propylene trimer | 280 |
| Ethyl acrylate | 140 |
| n-Butyl acrylate | 98 |
| 2-ethylhexyl acrylate | 42 |
| Cumene hydroperoxide | 2.8 |

Process: That of Example 1, except polymerization temperature of 220° C. at 115 psig pressure. Product yield 250 parts.

EXAMPLE 8

| Charge: | Parts: |
|---|---|
| Propylene tetramer (a mixture of $C_{12}$ olefins) ($P_4$) | 504 |
| Ethyl acrylate | 85.5 |
| n-Butyl acrylate | 85.5 |
| Cumene hydroperoxide | 1.71 |

Process: That of Example 1, except polymerization temperature was 210° C. and pressure 65 psig. Product yield 160 parts.

The plasticizing properties of the above plasticizers (Examples 1-8) to 67 phr in PVC and with 1.7 parts Ba/Cd laurate stabilizer are listed in Table I. The details of the test methods used are described in Rohm and Haas Publication MR-80.

EXAMPLE 9

| Charge: | Parts: |
|---|---|
| Propylene trimer | 350 |
| n-Butyl acrylate | 160 |
| Acrylonitrile | 8 |
| Cumene hydroperoxide | 3.5 |

Process: That of Example 1, product yield 170 parts.

EXAMPLE 10

As a comparison, conventional polyester plasticizers, poly-(propylene adipate) (PPA) of molecular weight ($M_n$) of about 900 and 4000, and conventional monomeric plasticizer, dioctyl phthalate (DOP), are incorporated in the same PVC formulation and compared in Table I to the plasticizers of Examples 1-9. The plasticizers of the instant invention can be made with varying degrees of plasticizing efficiency, low temperature flexibility, extraction resistance, and migration resistance. The preferred composition (Example 4) has adequate plasticizing efficiency and low temperature flexibility to be commercially acceptable, and has superior resistance to extraction by oils and hydrocarbons and migration into materials such as foam rubber when compared to polyesters of similar mol. wt. and when compared to common monomeric plasticizers. In addition, the composition of Example 4 is dramatically superior to the common monomeric plasticizer for resistance to loss via volatility and extraction by soapy water.

TABLE I

| Plasticizer No. of Example | 1 | 2 | 3 | 4 | 6 | 7 | 8 | PPA | PPA | DOP |
|---|---|---|---|---|---|---|---|---|---|---|
| $\overline{M}_n$ | 1150 | 880 | 890 | 780 | 907 | 1260 | 1000 | 900 | 4000 | 390 |
| Olefin | $P_3$ | $P_3$ | $P_3$ | $P_3$ | $P_3$ | $P_4$ | $P_3$ | | | |
| Olefin Wt.-% | 15 | 25 | 30 | 25 | 15 | 25 | 20 | | | |
| Acrylate | EA | EA | EA | EA/BA 1/1 | EA/BA 1/1 | EA/BA 1/1 | BA/AN | | | |
| G-H Viscosity | ZY+ | W+ | W | T | W+ | Y− | T | K | Z12 | A |
| VCS Color | 2 | 1 | 2 | 2 | 2 | 2 | 2 | 1 | 5 | 1 |
| Shore A Hardness, 10 sec. | 88 | 83 | 80 | 79 | 86 | 86 | 84 | 72 | 87 | 68 |
| T135,000. °C. | +12.5 | +5 | −3 | −5.5 | −2.0 | −6.5 | −8 | −17 | −6 | −35 |

TABLE I-continued

| Plasticizer | | | | | | | | | | |
|---|---|---|---|---|---|---|---|---|---|---|
| No. of Example | 1 | 2 | 3 | 4 | 6 | 7 | 8 | PPA | PPA | DOP |
| Volatility. 24 hr. 90° C. % (ACOG/14X) | 2.0 | 3.6 | 2.1 | 1.2 | 1.7 | 4.8 | 1.8 | 1.3 | 0.6 | 6.2 |
| 1% Ivory Flakes Extr'n., 24 hr./90° C., % | 7.0 | 7.2 | 10.5 | 3.6 | 6.3 | 9.7 | 2.2 | 4.5 | 8.3 | 6.9 |
| n-Hexane Extr'n., 2 hr./°C., % | 0.3 | 1.9 | 6.8 | 10.6 | 7.8 | 17.1 | 20 | 12 | 0.2 | 27.7 |
| Atreol No. 9 Extr'n., 10 days/RT,% | 0.1 | 0.1 | | 0.4 | | | 2.0 | 7.3 | 0.1 | 9.0 |
| Migr'n. into Foam Rubber 7 days/60° C., ¼ psi,% | 1.6 | 3.3 | | 3.4 | | | 3.2 | 6.4 | 0 | 14.4 |

EXAMPLE 11

Critical tests for the amount of volatile material in a compound are the automotive fogging tests. The Fisher Body Division of General Motors Corp. Test No. 46-3, revised 2/67, and conducted at 175° F., is utilized for the present tests. The performance of the composition of Example 4 is shown in Table II.

TABLE II
FISHER BODY TEST NO. 46-3, TEMP. 175° F.

| Plasticizer* | Deposit On Glass |
|---|---|
| Material From Example 4 (Table I) | None |
| DOP | Gross |
| Glass Plate Control | None |

*Formulation: 100 PVC
67 Plasticizer
1.7 Ba/Cd Stabilizer

EXAMPLE 12

Insulation for electrical wires and insulation for electrical wires and insulating tapes are frequently required to maintain a high degree of resistivity after immersion in or exposure to water. Plasticizers of the instant invention (Examples 3 and 4) are equivalent in performance to DOP (and industry standard) and superior to conventional polyester plasticizers for maintaining volume resistivity after immersion in water, as illustrated in Table III. All are evaluated in the following formulation:

100 Parts PVC;
55 Parts Plasticizer;
10 Parts Dibasic lead phthalate;
5 Parts No. 33 clay;
0.5 Parts Paraffin wax;
0.5% by weight bisphenol A based on the plasticizer content.

TABLE III

| | Example 3 | Example 4 | DOP | PPA $\overline{M}_n = 1000$ |
|---|---|---|---|---|
| Volume Resistivity ohm-cms $\times 10^{-12}$ | | | | |
| 90° C. Dry | 1.0 | 1.5 | 0.4 | 0.6 |
| After Immersion in Water at 75° C. For | | | | |
| 1 Day | 2.6 | 1.6 | 1.2 | 0.07 |
| 1 Week | 3.8 | 0.6 | 0.9 | 0.04 |
| 1 Month | 0.5 | 0.9 | 1.2 | 0.01 |

EXAMPLE 13

In Table IV, a side-by-side comparison is presented between the plasticizers prepared in accordance with U.S. Pat. No. 3,224,996 versus those of the present invention. Plasticizers of similar composition (olefin to acrylate ratio, wt.-%) and mol. wt. have been selected for comparison. The advantages of the plasticizers of the present invention over prior art plasticizers are in compatibility (flux times, clarity, and color slab, stress-whitening resistance and tear strength), efficiency, and low temperature flexibility (Tf). The preferred composition, F, has the best overall application properties.

EXAMPLE 14

| Charge: | Parts: |
|---|---|
| Propylene trimer | 252 |
| Ethyl acrylate | 57 |
| n-Butyl acrylate | 57 |
| Cumene hydroperoxide | 3.5 |

Process: That of Example 1, except polymerization temperature of 200° C. at 115 psig pressure. The product is lower mol. wt. material, separated via distillation at 200°–230° C./0.1 to 5 mm Hg from undistilled higher mol. wt. bottoms material after the removal of unreacted monomers. Product yield 70 parts.

TABLE IV

| Plasticizer | A | B* | C | D | E* | F | G | H |
|---|---|---|---|---|---|---|---|---|
| | P₃/EA | P/EA | Data Rept'd in Ex. 11 of U.S. 3,224,996 P/EA | Data Rept'd in Ex. 12 of U.S. 3,224,996 P/MA | E/EA | P₃/EA/BA | P₃/EA/BA | P₃/EA |
| Ratio of components, wt.-% (±5%) | 30/70 | 30/70 | 30/70 | 30/70 | 30/70 | 25/37.5/37.5 | 25/50/25 | 25/75 |
| $M_n$ | 890 | 908 | 772 | 684 | 1190 | 780 | 800 | 880 |
| Plasticizer in PVC, wt.-% | 40 | 40 | 40 | 40 | 40 | 40 | 40 | 40 |
| Tear Strength | V. Good | Good(−) | Not Rept'd | Not Rept'd | Poor | V. Good | V. Good | V. Good |
| Clarity of Slab | Good | Poor | Not Rept'd | Not Rept'd | Poor | Good | Good | Good |
| Color of Slab | Lt.Yellow | Dk.Tan | Not Rept'd | Not Rept'd | Straw | Pale Straw | Pale Straw | Straw |

TABLE IV-continued

| Plasticizer | A | B* | C | D | E* | F | G | H |
|---|---|---|---|---|---|---|---|---|
| Flux Time, min. | ¾-1 | 1-1½ | Not Rept'd | Not Rept'd | 2 (+) | 1-1½ | 1-1½ | 1-1½ |
| Degree of Stress-Whitening | None | Slight (+) | Not Rept'd | Not Rept'd | Slight (+) | None | None | None |
| Shore A Hardness | 80 | 89 | 88 | 87 | 86 | 79 | 82 | 83 |
| T135,000, °C. (low temp. flexibility, lower being better) | −3 | +6 | −5.5 | +4 | −2.0 | −5.5 | −1.5 | +5 |
| Volatility, 24 hr./90° C., % (ACC6/14X) | 2.1 | 2.8 | 2.9 | 3.4 | 0.8 | 1.2 | 1.6 | 3.6 |
| 1% Ivory Flakes Extr'n., 24hr./90° C., % | 10.5 | 5.3 | 5.0 | 11.7 | 1.3 | 3.6 | 3.9 | 7.2 |
| n-Hexane Extr'n., 2hr./°C., % | 6.8 | 5.0 | 31.8 | 16.5 | 8.6 | 10.6 | 6.9 | 1.9 |

Note:
$P_3$ = propylene trimer, a mixture of $C_9$ olefins
P = propylene monomer
E = ethylene
EA = ethyl acrylate
BA = butyl acrylate
MA = methyl acrylate
* = plasticizers B and E were prepared according to U.S. 3,224,996.

EXAMPLE 15

| Charge: | Parts: |
|---|---|
| Propylene trimer | 350 |
| n-Butyl acrylate | 163 |
| 2-Hydroxyethyl acrylate | 14 |
| Cumene hydroperoxide | 3.5 |

Process: That of Example 1, except polymerization temperature of 235° at 135 psig pressure. The product is obtained after stripping the unreacted monomers (propylene trimer, n-butyl acrylate and 2-hydroxyethyl acrylate). Product yield: 185 parts.

EXAMPLE 16

| Charge: | Parts: |
|---|---|
| Di-isobutylene | 310 |
| n-Butyl acrylate | 163 |
| 2-hydroxyethyl acrylate | 14 |
| Cumene hydroperoxide | 3.5 |

Process: That of Example 1, except polymerization temperature of 215° C. at 150 psig pressure. The product was obtained after stripping the unreacted monomers. Product yield 195 parts.

The polymers of Examples 14–16 were evaluated as a plasticizer for poly(vinyl butyral) (PVB) resin. The evaluation data are described in Table V. The plasticizing properties of Examples 14–16 have been compared with commercially used plasticizer triethylene glycol di-2-ethylbutyrate (Table V). The plasticized PVB resins are especially useful as the interlayers in laminated safety glass in architectural and vehicle applications. The techniques for evaluating the plasticizer properties described in Table V are well known to those who are skilled in the art.

TABLE V*

| Plasticizer at 45 phr No. of Example | 14 | 15 | 16 | Triethylene Glycol di-2-ethylbutyrate |
|---|---|---|---|---|
| $\overline{Mn}$ | 500 | 700 | 800 | — |
| Olefin | $P_3$ | $P_3$ | DIB | — |
| Olefin wt.-% | 40 | 25 | 30 | — |
| Acrylate | EA/BA = 1/1 | BA/2-HEA = 11.5/1 | BA/2-HEA = 11.5/1 | — |
| G-H Viscosity | G | K | M | — |
| VCS Color | 1 | 2 | 2 | 1 |
| Compatibility | C | C | C | C |
| Low Temperature Fluxibility, 135,000, °C. | −18 | −8 | −5 | −38 |
| Brittle Point, °C. | −35 | −38 | −20 | −66 |
| Volatility, 4 hrs/150° F. in air % loss | 0.90 | 0.60 | 0.75 | 0.5 |
| High Humidity Spew, 4° C./7 Days | Slight | Def. | Def.+ | Def.+ |
| Water Immersion 100° F./10 mins. % absorbed | 0.3 | 0.45 | 0.35 | 0.7 |
| % Plasticizer extracted | 1.10 | 0.90 | 0.7 | 0.9 |
| Tensile Strength, psi | 3850 | 3000 | 3200 | 3000 |
| 100% Modulus, psi | 1320 | 850 | 1100 | 230 |
| % Ult. Elongation | 305 | 285 | 290 | 235 |
| Clarity of Film | Excellent | Good | Fair | Excellent |

PVB resin ("Butacite") was obtained from E.I. duPont Co. Application evaluation was carried out on 30 mil pressed sheet utilizing the procedure known to the art.

EXAMPLE 17

The preparation technique of Example 1 was employed to prepare a polymer suitable for plasticization of PVC based on an α-olefin. To the reactor were charged
  110 Parts (1.3 moles) hexene - 1
  700 Parts toluene to the reactor was heated to 210° C. and to it was fed over four hours
  334 Parts (3.74 moles) ethyl acrylate
  195 Parts toluene
  8.4 Parts cumene hydroperoxide
the reactor was heated an additional one-half hour at 210° C., cooled, vented, and the toluene, unreacted monomers and low volatiles stripped as in Example 1.

EXAMPLE 18

The polymer of Example 17 was compared against a conventional polyester plasticizer in the manner taught in Example 10. At 67 phr, the following properties were found, demonstrating utility of the subject polymer as a plasticizer in PVC:

|  | Example 17 | Conventional Polyester |
|---|---|---|
| Volatility, % | 1.4% | 0.7 |
| Soap extraction, % | 7.9% | 5.2 |
| Hexane extraction, % | 5.5% | 1.0 |
| Shore A * Hardness | 91/87 | 82/79 |
| $T_{135,000}$, °C. | −3 | −15 |

EXAMPLE 19

To a reactor similar to that described in Example 1 was charged 660 parts (4.7) moles of decene-1. The reactor was swept with nitrogen for 10 minutes, sealed and heated to and maintained at 135° C. The pressure within the reactor throughout the run varied from 10–20 psig. (0.7–1.4 kg./cm.² gauge). Over a period of three hours was fed 400 g. (4 moles) of ethyl acrylate and 13.2 parts of t-butyl perbenzoate. The reactor was held for one hour further and then stripped at 150° C./0.5 mm. pressure to yield 442 g. of polymeric non-distilled product, analyzing as 48% olefin/52% acrylate by weight, number average molecular weight by gel permeation chromatography ($\overline{M}_n$ - GPC) 3860.

EXAMPLE 20

In a manner similar to that used in Example 19 were prepared the following polymers:

| POLYMER | COMPOSITION | | |
|---|---|---|---|
|  | Olefin, wt. % | Acrylate, wt. % | $M_n$–GPC |
| 20-A | Hexene-1, 37 | Ethyl 31.5 Butyl 31.5 | 1430 |
| 20-B | Octene-1, 39 | Ethyl, 61 | 4230 |
| 20-C | Dodecene-1, 50 | sec.-Butyl, 50 | 4330 |
| 20-D | $C_{11}$—$C_{14}$ mix, 62 | Ethyl, 38 | 4330 |

EXAMPLE 21

On a two-roll mill operating at speeds of 26 rpm (front roll) and 20 rpm (back roll) were milled for four minutes at 350° C. blends of the polymeric additive of Example 19 and several polypropylene samples. Flow data were determined by ASTM-D-1238, condition L and are shown in the following Table:

|  | Flow[1] (g./10,in.) | | | | |
|---|---|---|---|---|---|
|  |  | Oligomer Modified (Weight Percent) | | | |
|  | Unmodified | 2 | 3 | 4 | 5 |
| Profax[2] 6523 | 4.3 | — | — | — | 11.0 |
| Profax 8623/Profax 6323 (1:1) | 7.3 | 10.5 | — | — | 25 |
| Profax 7523 | 5.7 | 7.8 | 8.0 | 8.9 | — |
| Exxon[3] 805Mc | 6.4 | 8.5 | 9.2 | 10.5 | 13 |

[1]ASTM D-1238 condition L (g./10 min.); a higher value shows improved flow
[2]Hercules Inc.
[3]Exxon Chemicals

EXAMPLE 22

Blends of the additive of Example 19 with several commercial modified polypropylenes were prepared by mixing in a Henschel mixer, extending to form pellets, and injection molding. The properties are shown in Table VI; it should be noted that impact strength, heat distortion temperature and tensile strength are only slightly changed, while flow continues to be improved.

EXAMPLE 23

The polymeric additives (10 parts) of Examples 19 and 20 were milled for 5 minutes at 350° F. with 100 parts of Uniroyal's thermoplastic elastomer TPR-1900, believed to be a graft or blend of polypropylene with an ethylene-propylene rubber similar to materials taught in Fischer U.S. Pat. No. 3,862,106. Flow properties were measured at several shear rates on a Siegloff-McKelvay thermometer at 400° F.

|  | MELT VISCOSITY, Poise at 400° F. | | | |
|---|---|---|---|---|
|  |  | SHEAR RATE$^{-1}$ sec | | |
| SAMPLE | ADDITIVE 10 phr | 10 | 40 | 200 |
| TPR-1900 | — | 45700 | 18800 | 6400 |
| TPR-1900 | Ex. 19 | 14300 | 5900 | 2600 |
| TPR-1900 | Ex. 20-A | 12500 | — | — |
| TPR-1900 | Ex. 20-B | 12300 | — | — |
| TPR-1900 | Ex. 20-C | 22000 | — | — |
| TPR-1900 | Ex. 20-D | 14300 | — | — |

TABLE VI
PHYSICAL PROPERTIES OF MODIFIED AND UNMODIFIED POLYPROPYLENE

|  | Melt[1] Flow (g/10 min.) | IZOD IMPACT[2] (ft.-lb.) | | | DTUFL[3] 66 psi | (°C.) 264 psi | Elongation (%) | Tensile Stress (psi) | Tensile Modulus (psi) | Gardner Impact (in.-lb., RT) |
|---|---|---|---|---|---|---|---|---|---|---|
|  |  | Notched 23° C. | Notched −18° C. | Unnotched −18° C. |  |  |  |  |  |  |
| pp-8623/pp-6323 (1:1)[4] | 7.2 | 1.1 ± .1 | 0.3 ± .1 | 8.0 ± 2.3 | 112 | 58 | 8.9 | 3800 | 175,500 | 118 ± 8 |
| pp-8623/pp-6323/ oligomer (2%) | 10.0 | 1.1 ± .2 | 0.2 ± .1 | 8.8 ± 1.6 | 110 | 55 | 9.9 | 3600 | 163,500 | 108 ± 7 |

TABLE VI-continued
PHYSICAL PROPERTIES OF MODIFIED AND UNMODIFIED POLYPROPYLENE

| | Melt[1] Flow (g/10 min.) | IZOD IMPACT[2] (ft.-lb.) | | | DTUFL[3] | (°C.) | Elongation (%) | Tensile Stress (psi) | Tensile Modulus (psi) | Gardner Impact (in.-lb., RT) |
| --- | --- | --- | --- | --- | --- | --- | --- | --- | --- | --- |
| | | Notched 23° C. | Notched −18° C. | Unnotched −18° C. | 66 psi | 264 psi | | | | |
| pp-7523[4] | 4.6 | 1.6 ± .1 | 0.3 ± .1 | 4.8 ± 1.1 | 108 | 60 | 12.1 | 4000 | 183,800 | 109 ± 7 |
| pp-7523[4]/ oligomer (5%) | 10.0 | 1.4 ± .1 | 0.2 ± .1 | 6.3 ± .6 | 115 | 54 | 12.1 | 3500 | 150,800 | 125 ± 7 |
| Exxon - E-805 mc[5] | 4.9 | 1.8 ± .3 | 0.4 ± .2 | 13.2 ± 3.2 | 123 | 56 | 14.3 | 3700 | 158,600 | 118 ± 6 |
| Exxon oligomer (4%) | 8.6 | 1.8 ± .1 | 0.3 ± .2 | 16.9 ± 2.2 | 106 | 56 | 14.6 | 3300 | 145,600 | 122 ± 16 |

[1] ASTM D-1238 Condition 1
[2] ASTM D-256
[3] ASTM D-648 (Distortion Temperature Under Load)
[4] Hercules Inc.
[5] Exxon Chemicals
[6] ASTM D-638 - 61T (0.3 in./min.)

EXAMPLE 24

To 100 parts of TPR-1900 is added 5 or 10 parts of the additive of Example 19 by first heating the TPR to 350° F. in a Banbury mixer, incorporating the additive, and mixing to a dump temperature of 360°-370° F. The mix is then sheeted on a two-roll mill, granulated, and injection molded into 2"×6"×0.075" panels. Improved injection molding of polypropylene was seen for the modified samples. Rheological properties are measured on an Instron capillary rheometer at 400° F.

| FORMULATION | TPR-1900 | +5 phr. Ex. 17 | +10 phr. Ex. 17 |
| --- | --- | --- | --- |
| Melt Viscosity poises | | | |
| at 4.1 sec.$^{-1}$ | 59600 | 39000 | 35000 |
| at 10 sec.$^{-1}$ | 33000 | — | 20000 |
| 1367 sec.$^{-1}$ | 1200 | 920 | 820 |
| Shore "A" Hardness | 92 | 92 | 93 |
| Shore "D" Hardness | 39 | 37 | 35 |
| Tensile strength, psi. | 1570 | 1430 | 1330 |

We claim:

1. A blend of about 1 to 600 parts by weight of a plasticizer which is the free radical polymerization product of (A) one or more monoethylenically unsaturated hydrocarbons having 6 to 18 carbon atoms wherein said monoethylenically unsaturated hydrocarbon is an oligomer, and (B) one or more $C_1$–$C_6$ esters of monoethylenically unsaturated monocarboxylic acids, or diesters of dibasic acids, the number average molecular weight being about 500 to 6000, the molar ratio of (A) to (B) being about 0.1/1 to 1.5/1, with about 100 parts of a different polymer.

2. The blend of claim 1 wherein the different polymer is selected from the group connsisting of polypropylene, polyethylene, polyvinyl acetate, acrylic polymers, polyvinyl butyral, copolymer of poly(vinyl butyral-vinyl alcohol), ethylene-propylene copolymers, butadiene-acrylonitrile copolymers, butadiene-styrene polymers, polychloroprene, rigid polyesters, rigid phenolic resins, urea formaldehyde resins, and melamine.

3. The blend of claim 1 in which 2 to 12 parts of said plasticizer are used per 100 parts of said different polymer.

4. The blend of claim 1 wherein the different polymer is polyvinyl chloride.

5. The blend of claim 1 wherein the different polymer is polypropylene blended with or grafted to an ethylene-propylene polymer.

6. The blend of claim 1 wherein (B) is one or more $C_1$ to $C_6$ alkyl acrylates.

7. A blend of claim 6 wherein acrylates are selected from the group consisting of methyl acrylate, ethyl acrylate, butyl acrylate, and mixtures thereof.

8. The blend of claim 6 wherein (A) is propylene trimer and (B) is a mixture of ethyl acrylate and butyl acrylate.

9. The blend of claim 1 wherein (A) is an olefin of 6 to 12 carbon atoms and (B) is a $C_2$ to $C_4$ alkyl acrylate.

10. The blend of claim 1 wherein (A) is propylene trimer.

11. The blend of claim 1 wherein (A) is decene-1.

12. The blend of claim 1 wherein (A) is decene-1, (B) is ethyl acrylate and the molar ratio is 0.5/1 to 1/1.

13.. The blend of claim 1 wherein polymerization product of (A) and (B) further includes polymerized units of (C) one or more monovinylidene compounds.

14. The blend of claim 13 wherein the molar ratio of (C) to the sum of (A) and (B) is up to about 0.25 to 1.

15. The blend of claim 13 wherein (C) is acrylonitrile, a hydroxyalkyl acrylate, or mixtures thereof.

* * * * *